(12) United States Patent
Kazachinsky et al.

(10) Patent No.: US 7,721,129 B2
(45) Date of Patent: May 18, 2010

(54) METHOD AND APPARATUS FOR REDUCING CLOCK FREQUENCY DURING LOW WORKLOAD PERIODS

(75) Inventors: Itamar S. Kazachinsky, Netanya (IL); Doron Orenstein, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1133 days.

(21) Appl. No.: 11/330,647

(22) Filed: Jan. 12, 2006

(65) Prior Publication Data

US 2006/0129860 A1 Jun. 15, 2006

Related U.S. Application Data

(62) Division of application No. 10/260,995, filed on Sep. 30, 2002, now Pat. No. 7,051,227.

(51) Int. Cl.
G06F 1/32 (2006.01)
(52) U.S. Cl. ..................................... 713/323
(58) Field of Classification Search ................ 713/323
See application file for complete search history.

(56) References Cited

U.S. PATENT DOCUMENTS

| | | | |
|---|---|---|---|
| 5,471,625 A * | 11/1995 | Mussemann et al. ........ 713/322 |
| 5,564,015 A | 10/1996 | Bunnell |
| 5,710,911 A | 1/1998 | Walsh et al. |
| 5,771,373 A | 6/1998 | Kau et al. |
| 5,815,725 A | 9/1998 | Feierbach |
| 6,151,262 A | 11/2000 | Haroun et al. |
| 6,163,583 A | 12/2000 | Lin et al. |
| 6,223,297 B1 | 4/2001 | Inoue |
| 6,233,690 B1 * | 5/2001 | Choi et al. ................... 713/322 |
| 6,268,749 B1 | 7/2001 | Fisch et al. |
| 6,272,642 B2 | 8/2001 | Pole, II et al. |
| 6,298,448 B1 | 10/2001 | Shaffer et al. |
| 6,311,281 B1 * | 10/2001 | Pole et al. ................... 713/322 |
| 6,343,363 B1 | 1/2002 | Maher et al. |
| 6,363,490 B1 | 3/2002 | Senyk |
| 6,609,211 B2 | 8/2003 | Atkinson |

OTHER PUBLICATIONS

Hansel A. Collins et al., "DDR-SDRAM, High-Speed, Source-Synchronous Interfaces Create Design Challenges", www.ednmag.com, (Sep. 2, 1999), pp. 63-72.
Donald Telian, "Design Process for Source-Synchronous Applications Using Custom Measurements", Cadence, (Aug. 2000), pp. 1-12.
Stephen H. Gunther et al., "Managing the Impact of Increasing Microprocessor Power Consumption", Intel Technology Journal Q1, (2001), pp. 1-9.
Rick O'Connor, "System Interconnect Today and the Road Ahead", Tundra Semiconductor Corporation, Bus & Boards Conference, Long Beach, California, (Jan. 1, 2002), pp. 1-15.

* cited by examiner

Primary Examiner—Thomas Lee
Assistant Examiner—Eric Chang
(74) Attorney, Agent, or Firm—Blakely, Sokoloff, Taylor & Zafman LLP

(57) ABSTRACT

A clock frequency control unit for an integrated circuit (IC) includes a clock generator, a finite state machine (FSM), and a gating circuit (GC). The FSM has at least first and second states corresponding to non-low workload low workload states, respectively. In the first state, the GC provides a clock signal to functional units of the IC with the same frequency as the clock generator output. In the second state, the GC reduces the frequency of the clock signal. In one embodiment, the GC masks out selected cycles of the clock generator output to reduce the clock signal frequency. The FSM monitors the operation of the IC to transition from the first state to the second state when selected "low workload" conditions are detected (e.g., long latency cache miss). Similarly, the FSM transitions from the second state to the first state when selected "non-low workload" conditions are detected.

11 Claims, 7 Drawing Sheets

METHOD AND APPARATUS FOR REDUCING CLOCK FREQUENCY DURING LOW WORKLOAD PERIODS

CROSS REFERENCE TO RELATED APPLICATIONS

This application is a divisional of prior application Ser. No. 10/260,995, filed Sep. 30, 2002 now U.S. Pat. No. 7,051,227.

FIELD OF THE INVENTION

Embodiments of the present invention relate to processor and, more particularly but not exclusively, to clock circuits for use in processors.

BACKGROUND INFORMATION

A semiconductor integrated circuit (IC) device, such as a processor, may include circuitry of many types of discrete circuit components, including transistors, resistors, and capacitors, as well as other components. Semiconductor IC manufacturers are subject to ever-increasing pressure to increase the speed (i.e. the clock rate) and performance of such IC devices while reducing package size and maintaining reliability. Thus, by way of example, a modern processor (e.g., general purpose microprocessors, digital signal processors, microcontrollers, etc.) may be implemented in a die that includes literally millions of closely spaced transistors and other discrete sub-micron components and operating at clock rates in the GHz range. As is well known, the power dissipation of a processor (and other IC devices) generally increases with operating frequency. As a result, these modern processors exhibit relatively high power dissipation. High power dissipation is generally undesirable and can be especially problematic in battery-powered applications.

One conventional technique to reduce power dissipation is "clock throttling". Typical clock throttling techniques include reducing the frequency of a clock signal provided to selected units or subunits of the processor. Clock throttling tends to reduce the performance of the processor since the clock frequency is reduced even when the processor is trying to perform useful work. In addition, current clock throttling solutions are relatively coarse (i.e., take a relatively large number of clock cycles to enter the reduced clock frequency mode and to return to the normal clock frequency mode).

Another conventional technique is to reduce the supply voltage provided to the processor. The lower supply voltage tends to slow the switching speed of the transistors in the processor, which in turn tends to reduce the performance of the processor. In addition, the lower supply voltage may undesirable increase the processor's noise sensitivity. Further, like clock throttling, changing the supply voltage is a relatively coarse power conservation technique. This technique is widely used as an efficient way of reducing power dissipation as the power relates to the voltage in the power of three. For example, lowering the voltage by 20% would lower the power by 49%, while hurting the performance (clock rate) by only 20%. The limitation is that it takes many millions of clock cycles to stabilize a new voltage on an IC.

These clock throttling and voltage reduction techniques are commonly used in controlling the temperature of the processor and, thus, the aforementioned shortcomings are acceptable to prevent damage to the processor. However, for purely power conservation applications, these shortcomings may be unacceptable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Embodiments of the present invention are described below in the context of power management of a processor; however, in light of the present disclosure, those of ordinary skill in the art will understand that the present description is generally applicable to all types of IC devices.

Figure 1:
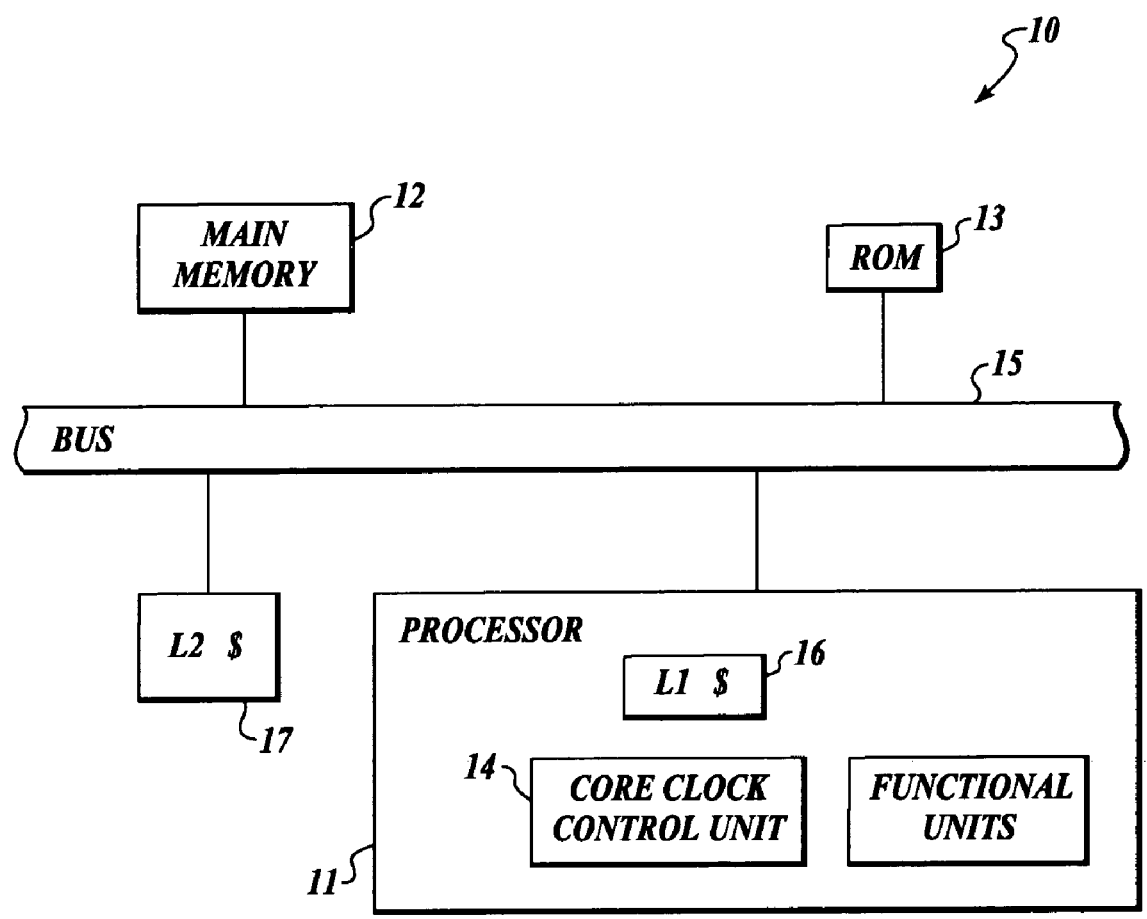
FIG. 1 is a block diagram illustrating a computer system having a clock frequency control unit according to one embodiment of the present invention.

FIG. 1 illustrates a computer system 10 having a processor 11 with a clock frequency control unit 14, according to one embodiment of the present invention. This embodiment of computer system 10 also includes a main memory 12, a read only memory (ROM) 13, a core clock a bus 15, a first level or internal cache 16 (embedded in processor 11), and a second level or external cache 17. In some embodiments, the second level cache is integrated with the processor and/or there may be other levels of caches either internal or external. Embodiments of clock frequency control unit 14 are described in more detail below in conjunction with FIGS. 3-8.

Processor 11 is coupled via a bus 15 to main memory 12, which may comprise one or more dynamic random access memory (DRAM) devices for storing information and instructions to be executed by processor 11. Main memory 12 may also be used for storing temporary variables or other intermediate information during execution of instructions by processor 11. ROM 13, for storing static information and instructions for processor 11, is coupled to processor 11 via bus 15.

Although not shown in FIG. 1, processor 11 typically includes an instruction decoder unit, an execution unit, internal clock circuitry, a register file unit, address translation unit and a bus interface unit, all implemented on a semiconductor die. The bus interface unit is coupled to bus 15, as well as main memory 12 and ROM 13. The bus interface unit facilitates transmission of data between main memory 12 and processor 11, and performs fetching of instructions and other data from ROM 13. The address translation unit performs memory management for processor 11. For example, the address translation unit stores the memory addresses (whether in main memory 12, internal cache 16, or other memory) of data being used by the processor 11 during operation. The instruction decoder unit decodes instructions and other control signals received by processor 11.

The execution unit is intended to present a broad category of microprocessor functional units providing a wide range of functions. By way of example, the execution unit may include an arithmetic and logic unit for performing arithmetic operations, including shifts, addition, subtraction, multiplication, and division. The register file unit may include one or more types of registers for storing data being used by processor 11. For example, the register file unit may include integer registers, status registers, instruction pointer registers, and floating point registers, as well as others. If present, the internal cache may be used, for example, to store data and control signals from main memory 12.

The internal clock circuitry may include a phase lock loop (PLL) circuit for adjusting the external clock frequency (either increasing or decreasing this frequency) to achieve a desired operating frequency for processor 11. In some embodiments, the Internal clock circuitry outputs the processor core clock signal(s). In one embodiment, core clock frequency control (CCFC) unit 14 is part of internal clock circuitry.

Further, computer system 10 can include other devices (not shown) that are coupled to processor 11 (typically via bus 15). For example, input devices, such as a keyboard or mouse, are coupled to processor 11. Output devices are also coupled to processor 11. Typical output devices include printers and display monitors. Data storage devices are also coupled to processor 11. Common data storage devices include hard disk drives, floppy disk drives, and CD ROM drives. In one embodiment, processor 11 is also coupled to a supply voltage source (not shown) and an external clock source (not shown).

In light of this disclosure, those of ordinary skill in the art will understand that computer system 10 may include other components and subsystems in addition to those shown and described with respect to FIG. 1. By way of example, computer system 10 may include video memory, as well as other dedicated memory, and additional signal lines and busses.

The embodiment of processor 11 presented in FIG. 1 is illustrative. In light of this disclosure, those of ordinary skill in the art will understand that, in practice, a modern processor is generally more complex and may include additional components. To improve clarity, FIG. 1 does not show internal buses and other communication paths that electrically interconnect the various functional units of processor 11 (e.g., the aforementioned bus interface unit, address translation unit, instruction decode unit, execution unit, and register file unit). Accordingly, processor 11 is presented without limitation, and the present invention is generally applicable to all types of processors (e.g., microprocessors, microcontrollers, digital signal processors, etc.), irrespective of the specific architecture employed.

Core Clock Frequency Control

In one embodiment, CCFC unit 14 is configured to interface with one or more of the functional units on processor 11, as well as the internal clock circuitry. CCFC unit 14 is configured to detect events within processor 11 that indicate or precede periods of low processor workload. For example, in some processors, an external cache miss can cause the processor to perform idle operations for hundreds of core clock cycles. During such low workload periods, the core clock frequency can be reduced with little or no impact on performance. In one embodiment, the core clock frequency is reduced to the operating frequency of bus 15 during low workload periods. In other embodiments, frequency of the core clock frequency can be reduced to other speeds. The core clock can even be completely stopped in other embodiments, but some of the processor's functions should be maintained (e.g., the bus interface to bus 15 to detect when the low workload condition ends, accept snoop requests, or other important events).

Figure 2:
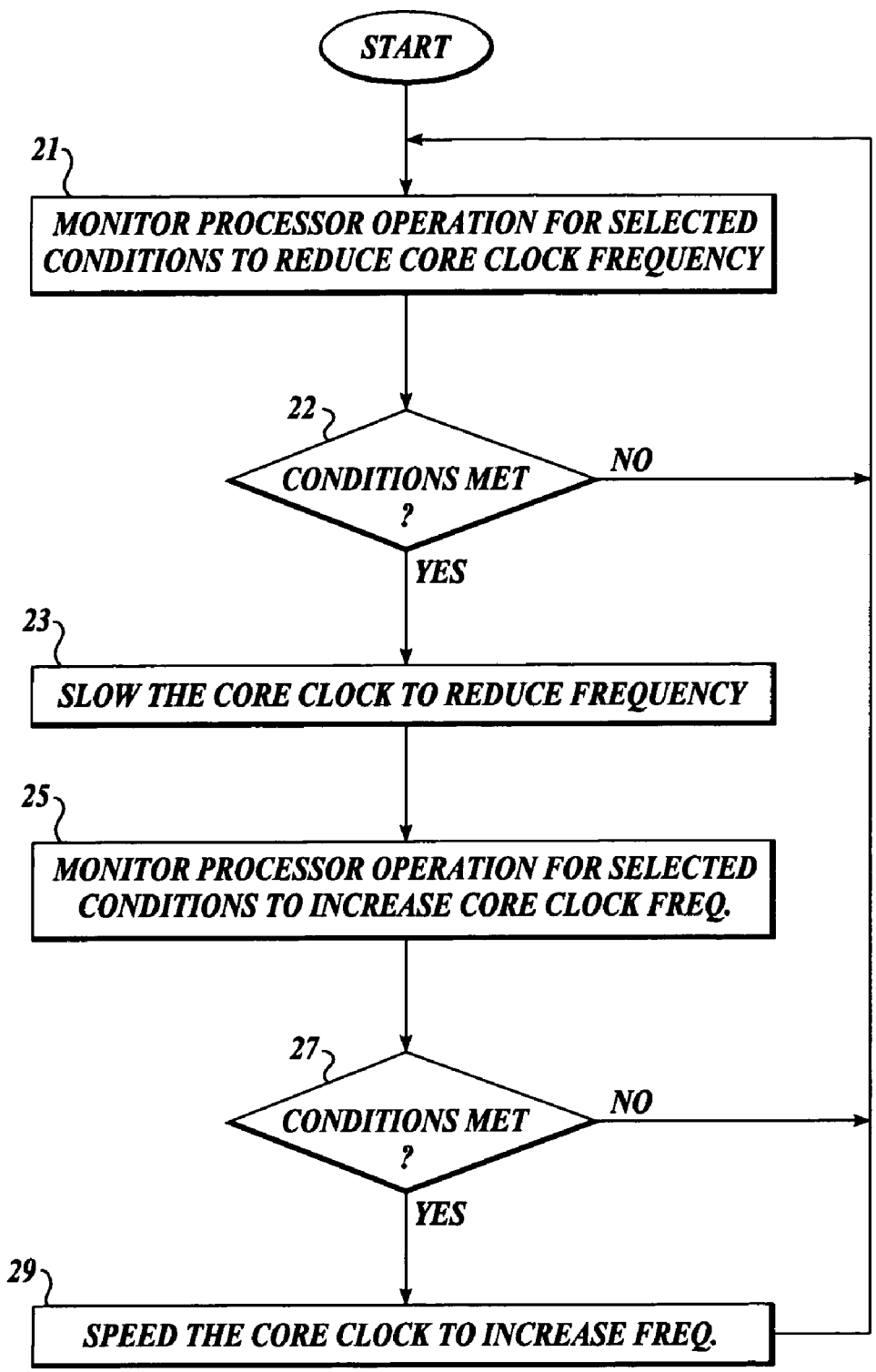
FIG. 2 is a flow diagram illustrating the operational flow of the system of FIG. 1, according to one embodiment of the present invention.

FIG. 2 illustrates the operational flow of system 10 (FIG. 1) in reducing the core clock frequency during low workload periods, according to one embodiment of the present invention. Referring to FIGS. 1 and 2, this embodiment of system 10 operates as follows.

The operation of processor 11 is monitored for selected conditions that indicate or precede a low workload period as shown in a block 21. In one embodiment, CCFC unit 14 monitors the operation of processor 11 for the selected conditions. For example, CCFC unit 14 can monitor a cache miss signal that is provided by external cache 17. External cache 17 asserts this signal when a cache miss occurs (e.g., a data miss). Typically, external cache 17 will also requests a block of data from main memory 12. While the data is being retrieved (typically requiring hundreds of "fast" core clock cycles), processor 11 is mainly idle.

Another example of a low workload period can occur in processor architectures having an out-of-order dispatcher and in-order instruction queue. In such architectures, a significant low workload period can occur when a code miss or an instruction cache miss occurs and the processor's out-of-order dispatcher and in-order instruction queue are empty. There are other events that can also cause processor 11 to "idle" for significant numbers of "fast" core clock cycles, depending on the architecture and/or configuration of the processor.

In addition, for some events, there may be additional conditions that should be monitored to determine whether the event would result in a low workload period. For example, a data miss in the external cache generally results in a low workload period, but in some processor architectures (e.g., pipelined, out-of-order etc.), the processor may continue to do useful work for a relatively short period of time after a cache miss. Thus, in some embodiments, additional conditions may be included. For example, a grace period may be added after the cache miss signal is asserted to allow pipelined operations to be completed.

If the selected conditions are not met, as shown by a block 22, the operational flow returns to block 21 to continue monitoring. However, if the conditions are met, the core clock frequency is reduced, as indicated by a block 23. In one embodiment, CCFC unit 14 reduces the frequency of the core clock signal to the operating frequency of bus 15. Further, in one embodiment, CCFC unit 14 reduces the core clock frequency (as received by functional units of processor 11) by masking some clock cycles of the "fast" core clock signal, rather than by adjusting the output frequency of an oscillator, a PLL, or delay locked loop.

The operation of processor 11 is then monitored for selected conditions that indicate that the low workload period has ended, as shown in a block 25. In one embodiment, CCFC unit 14 monitors the operation of processor 11 for the selected conditions. For example, CCFC unit 14 may receive a "memory ready" signal after the cache miss, which indicates that the processor may now stop idling and perform useful work. In other embodiments, these conditions may include the processor receiving a snoop request via bus 15, an interrupt signal, a reset signal, an initialize signal, or a stop clock signal, or other signal that requires a fast response from the processor. If the conditions are not met, the operational flow returns to block 25. However, if the conditions are met, the core clock frequency is increased. In one embodiment, terminating the masking of core clock signal cycles increases the core clock frequency. After the core clock frequency is increased, the operational flow returns to block 21.

Figure 3:
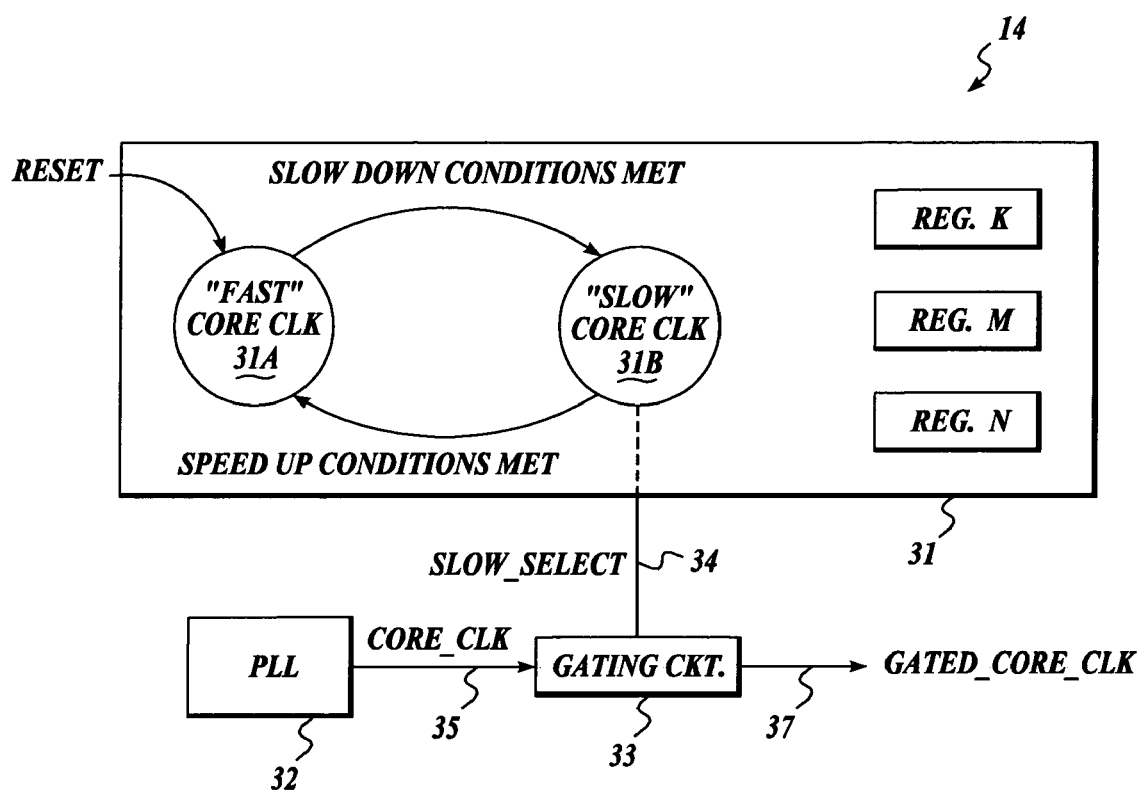
FIG. 3 is a block diagram illustrating an implementation of the clock frequency control unit of FIG. 1, according to an embodiment the present invention.

FIG. 3 illustrates an implementation of CCFC unit 14 (FIG. 1), according to an embodiment of the present invention. In this embodiment, CCFC unit 14 includes a finite state machine 31, a phase lock loop 32, and a gating circuit 33.

In one embodiment, finite state machine 31 is implemented in hardware using combinatorial logic and has two states. One state is a "fast" core clock state 31A and the other is a "slow" core clock state 31B. The "fast" core clock state 31A can be entered from either a RESET operation (e.g., when the processor is first powered up) or from the "slow" core clock state 31B when selected "speed up" conditions are detected. The "slow" core clock state 31B can be entered from the "fast" core clock state 31A when selected "slow down" conditions are detected. When CCFC unit 14 is in the "slow" core clock state 31B, finite state machine 31 asserts a SLOW_SELECT signal and de-asserts the SLOW_SELECT signal when in the "fast" core clock state. Other embodiments may have more than two states for a tiered power reduction scheme. For example, there may be a state for a middle clock rate or a stop clock state.

In addition, some embodiments of finite state machine 31 can include counters, e.g. K, M and N, for tracking grace periods that can form part of the conditions for state transitions. For example, in one embodiment used in out-of-order architectures, the K counter can be used to provide a grace period to allow non-blocked memory store operations to a store buffer (not shown) to complete before transitioning to the "slow" core clock state 31B after an L2 cache miss. The M counter can be used to provide a grace period to allow an internal (L1) cache miss to be processed before transitioning to the "slow" core clock state 31B after a L2 cache miss. The N counter can be used to provide a grace period to allow pending long-latency instructions, such as multiply or divide, to complete before transitioning to the "slow" core clock state 31B after a L2 cache miss. These counters can be programmable in some embodiments allowing dynamic tuning by software.

The elements of this embodiment of CCFC unit 14 are interconnected as follows. Finite state machine 31 is connected to gating circuit 33 via a line 34, which propagates the SLOW_SELECT signal. Gating circuit 33 is connected to receive an oscillating output signal from phase lock loop 32 via a line 35. In addition, gating circuit 33 outputs a gated core clock signal via an output line 37.

In operation, depending on its state, finite state machine 31 monitors the operation of processor 11 (FIG. 1) for selected conditions that indicate that the state should be changed. For example, if finite state machine 31 is in the "fast" core clock state 31A, finite state machine 31 monitors the operation of processor 11 for selected conditions to enter the "slow" core clock state 31B. Similarly, if finite state machine 31 is in the "slow" core clock state 31B, finite state machine 31 monitors the operation of processor 11 for selected conditions to enter the "fast" core clock state 31A. As previously stated, after a RESET operation, finite state machine 31 enters the "fast" core clock state 31A.

In this embodiment, phase lock loop 32 outputs a relatively "fast" core clock signal (i.e., the CORE_CLK signal) with a frequency commonly in the GHz or near GHz range. In some embodiments, phase lock loop 32 can be controlled to change the frequency of its output signal, but this frequency control feature is separate from the operation of CCFC unit 14. In other embodiments, a different circuit can be used to output the CORE_CLK signal (e.g., an oscillator, an delay lock loop (DLL); a frequency divider, an external clock circuit, etc.)

Gating circuit 33 receives the CORE_CLK signal from phase lock loop 32 via line 35 and the SLOW_SELECT signal from finite state machine 31 via line 34. In this embodiment, when the SLOW_SELECT signal is de-asserted (i.e., when finite state machine 31 is in the "fast" core clock state 31A), gating circuit 33 outputs at output line 37 a GATED_CORE_CLK signal that has the same frequency as the CORE_CLK signal. The GATED_CORE_CLK signal is distributed as the "core clock" signal to the functional units of processor 11 (described above in conjunction with FIG. 1).

However, when the SLOW_SELECT signal is asserted (i.e., when finite state machine 31 is in the "slow" core clock state 31B), gating circuit 33 outputs at output line 37 the GATED_CORE_CLK signal with a frequency that is less than that of the CORE_CLK signal. In this embodiment, gating circuit 33 causes the frequency to be substantially equal to that of bus 15 (FIG. 1), which is typically significantly less than the CORE_CLK signal. For example, the CORE_CLK signal may be in the GHz or near GHz range while the operating frequency of bus 15 is 400 MHz.

In one embodiment, gating circuit 33 masks selected clock cycles of the CORE_CLK signal rather than change the period. This masking technique can reduce glitches (e.g. losing clock edges) in the GATED_CORE_CLK signal when finite state machine 31 transitions between the "slow" and "fast" core clock states 31A and 31B. In addition, in some embodiments, gating circuit 33 can be configured to help keep transitions of the GATED_CORE_CLK signal properly aligned with clock signal transitions of the operating frequency of bus 15; however, such embodiments tend to be more complex, which may be undesirable in some applications.

Figure 4:
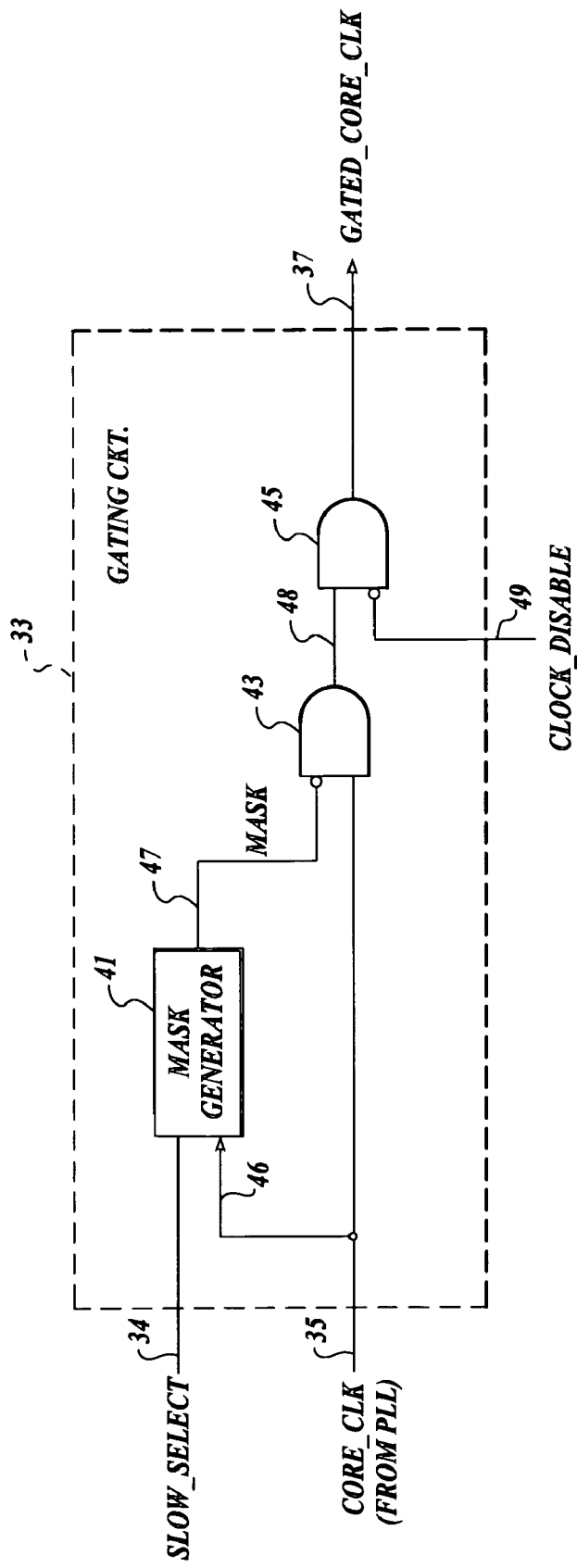
FIG. 4 is a diagram illustrating an implementation of the gating circuit of FIG. 3, according to one embodiment of the present invention.

FIG. 4 illustrates an implementation of gating circuit 33 (FIG. 3), according to one embodiment of the present invention. In this embodiment, gating circuit 33 includes a mask generator 41 and two-input AND gates 43 and 45. In this embodiment, mask generator 41 generates a MASK signal that is used to gate the CORE_CLK signal from phase lock loop 32 (FIG. 3). As previously described, in one embodiment gating circuit 33 masks out selected clock cycles of the CORE_CLK signal, which serves to effectively reduce the frequency of the resulting masked signal (i.e., the GATED_CORE_CLK signal).

The elements of this embodiment of gating circuit 33 are interconnected as follows. Mask generator 41 has two input leads, one connected to line 34 to receive the SLOW_SELECT signal and an input lead 46 connected to line 35 to receive the CORE_CLK signal. Mask generator 41 also has an output lead connected to an inverting input lead of AND gate 43 via a line 47. AND gate 43 has another input lead (non-inverting) connected to line 35 and an output lead connected to an input lead (non-inverting) of AND gate 45 via a line 48. The other input lead (inverting) of AND gate 45 is connected to a line 49 to receive a CLOCK_DISABLE (or STOP CLOCK) signal. AND gate 45 outputs the GATED_CORE_CLK signal via line 37.

In operation, when the CLOCK_DISABLE signal on line 49 is at a logic high level, the inverting input lead of AND gate 45 will cause AND gate 45 to output the GATED_CORE_CLK signal at a logic low level whatever the logic states of the SLOW_SELECT, MASK, and CORE_CLK signals.

When the CLOCK_DISABLE signal is at a logic low level, AND gate 45 functions, in effect, like a non-inverting buffer.

In this circumstance, AND gate 45 will output whatever signal is present on line 48 as the GATED_CORE_CLK signal. The signal present on line 48 is generated as follows.

AND gate 43 serves to gate the CORE_CLK signal onto line 48, based on the logic level of the MASK signal received via line 47. When the MASK signal is at a logic low level, the inverting input lead of AND gate 43 will cause AND gate to function as a non-inverting buffer, thereby outputting the CORE_CLK signal onto line 48. In this way, the CORE_CLK signal is not masked (i.e., propagated as the GATED_CORE_CLK signal via AND gates 43 and 45).

However, when the MASK signal is at a logic high level, the inverting input lead of AND gate 43 cause AND gate 43 to output a logic low level signal onto line 48 whatever the logic level of the CORE_CLK signal. As previously described, a logic low level on line 48 causes AND gate 45 to output the GATED_CORE_CLK signal with a logic low level. In this way, the CORE_CLK signal is masked.

Mask generator 41 generates the MASK signal when the SLOW_SELECT signal is asserted. As previously described, the MASK signal is used to mask out selected clock cycles of the CORE_CLK signal (via AND gates 43 and 45 as described below). In this embodiment, mask generator 41 causes the MASK signal to be at logic high levels during clock cycles that are to be masked. On the other hand, when the SLOW_SELECT signal is de-asserted, mask generator 41 causes the MASK signal to remain in a logic low level, thereby not masking any clock cycles of the CORE_CLK signal. An example of the masking is illustrated in FIG. 5.

Figure 5:
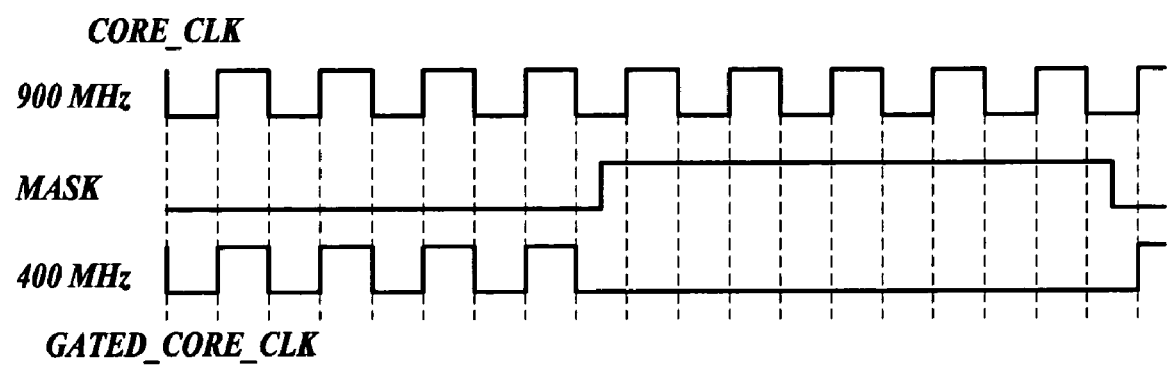
FIG. 5 is a timing diagram illustrating the timing of the gating circuit of FIG. 4, according to one embodiment of the present invention.

FIG. 5 illustrates the timing of gating circuit 33 (FIG. 4), according to one embodiment of the present invention. In this exemplary embodiment, the CORE_CLK signal has a frequency of 900 MHz and the desired GATED_CORE_CLK signal has a frequency of 400 MHz. In particular, in this embodiment, for every nine cycles of the CORE_CLK signal, five contiguous clock cycles of the CORE_CLK signal are masked, thereby allowing four clock cycles to propagate in the GATED_CORE_CLK signal. In this way, a 400 MHz signal is generated. In other embodiments, the masked cycles of the CORE_CLK signal need not be contiguous.

Figure 6:
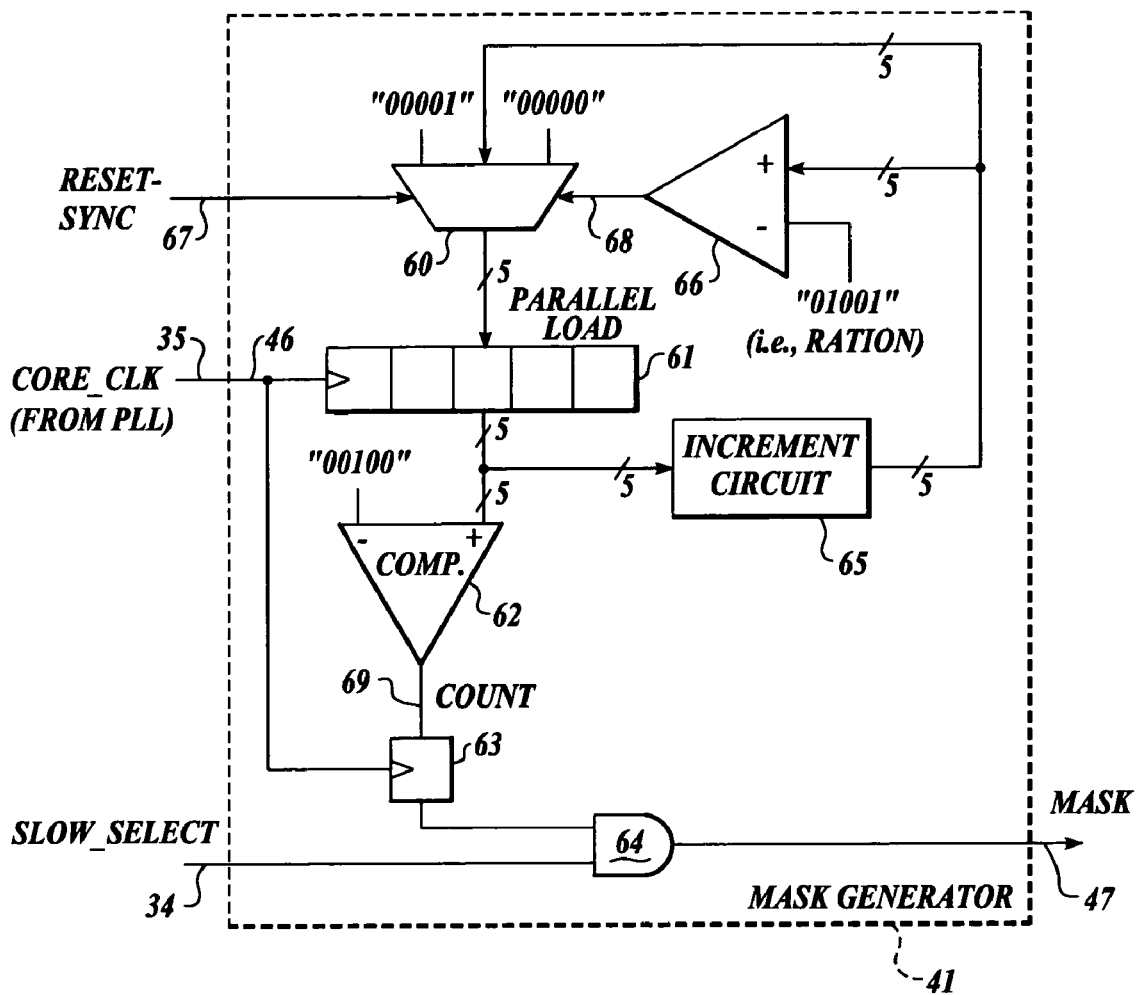
FIG. 6 is a schematic diagram illustrating an implementation of the mask generator of FIG. 4, according to one embodiment of the present invention.

FIG. 6 illustrates an implementation of mask generator 41 (FIG. 4), according to one embodiment of the present invention. In this embodiment, mask generator 41 includes a three-input multiplexer 60 (each input port being a five-bit input port), a parallel load register 61, a comparator 62 (each input port being a five-bit input port), a single bit register 63, a two-input AND gate 64, an increment circuit 65, and another comparator 66 (each input port being a five-bit input port).

In this embodiment, comparators 62 and 66 each compares two five-bit input signals received at a "positive" input port and a "negative" input port and outputs a single bit signal indicating whether the "positive" signal is greater than the "negative" signal. Increment circuit 65, in this embodiment, receives a five-bit signal and outputs the five-bit signal, incremented by one. For example, increment circuit 65 can be implemented as a decoder circuit that decodes five-bit signals into incremented five-bit signals.

The elements of this embodiment of mask generator 41 are interconnected as follows. Multiplexer 60 is connected to receive five-bit input signals "00001" and "00000" at two of its input ports. In a typical embodiment, these values are fixed but may be programmable in other embodiments. For example, these signals can be hardwired to the supply rails, or can be provided by registers or other memory devices (e.g., non-volatile devices such as fuses or antifuses). The third input port of multiplexer 60 is connected to an output port of increment circuit 65. The output port of multiplexer 60 is connected to the parallel load input port of register 61. Multiplexer 60 has a two lead control port, one control lead being connected to a line 67 to receive a RESET_SYNC signal and the other control lead being connected to an output lead 68 of comparator 66.

Comparator 66, in this embodiment, has its "negative" input port connected to receive a five-bit signal "01001" (corresponding to a 900 MHz CORE_CLK signal), and its "positive" input port connected to the output port of increment circuit 65. In some embodiments, this five-bit signal can be programmable to operate with varying rates of "Fast" clock (e.g., via registers or other memory devices).

In this embodiment, register 61 has a clock input terminal connected to line 35 to receive the CORE_CLK signal and a five-bit output port connected to the input port of increment circuit 65.

Comparator 62 has its "positive" input port connected the output port of register 61, its "negative" input port connected to receive a five-bit signal "00100" (corresponding to a 400 MHz GATED_CORE_CLK signal), and its output lead connected to the input terminal of register 63 via a line 69. In some embodiments, this five-bit input signal can be programmable to operate with varying rates of "Slow" clock (e.g., via registers or other memory devices). Register 63 has an inverting clock input terminal connected to line 35 (causing register 63 to be, in effect, delayed by a half cycle relative to register 61) and an output lead connected one input lead of AND gate 64. The other input lead of AND gate 64 is connected to line 34 to receive the SLOW_SELECT signal. The output lead of AND gate 64 is connected to line 4 (to propagate the MASK signal).

In operation, when the SLOW_SELECT signal is at a logic low level (i.e., during the "fast" core clock state 31A in FIG. 3), AND gate 64 outputs a logic low signal whatever the logic level of the output signal of register 63. As a result, the MASK signal at line 47 is at a logic low level, thereby not masking the CORE_CLK signal as described above in conjunction with the embodiment of FIG. 4.

In contrast, when the SLOW_SELECT signal is at a logic high level (i.e., during the "slow" core clock state 31B in FIG. 3), AND gate 64 functions as a non-inverting buffer for the output signal of register 63. Thus, when the output signal of register 63 is at a logic high level, the MASK signal at line 47 has a logic high level, thereby masking the CORE_CLK signal as previously described in conjunction with the embodiment of FIG. 4.

For this discussion of the operation during the "slow" core clock state 31B (FIG. 4), the output signal of AND gate 64, the output signals of registers 61 and 63, comparators 62 and 66, and the RESET_SYNC and CORE_CLK signals are "initially" at logic low levels. The current logic low level outputted by register 63 causes AND gate 64 to output the MASK signal with a logic low level. As previously described, the logic low level of the MASK signal allows gating circuit 33 (FIG. 4) to propagate the CORE_CLK signal as the GATED_CORE_CLK signal.

Multiplexer 60 is configured to select one of the five-bit signals present at its three input ports, according to the logic levels at lines 67 and 68. In this embodiment, when lines 67 and 68 are both at logic low levels, multiplexer 60 selects the output signal of increment circuit 65. When lines 67 and 68 are at logic low and logic high levels, respectively, multiplexer 60 selects the "00000" signal. When line 67 is at a logic high level, multiplexer 60 selects the "00001" signal. Thus, because lines 67 and 68 are both at logic low levels and register 61 outputs "00000" (which causes increment circuit 65 to output a "00001" signal), multiplexer 60 outputs a "00001" signal (received from increment unit 65) to the input port of register 61.

On the rising edge of the CORE_CLK signal (i.e., cycle 1), register 61 loads the "00001" from multiplexer 60, and register 63 loads a "0" from comparator 62. Then the "00001" signal from register 63 is outputted to comparator 62 and increment circuit 54. Because "00001" is less than "00100", comparator 62 outputs a logic low level to register 63 via line 69.

Increment circuit 65 then outputs a five-bit signal with a binary value that is one greater than that of the five-bit signal outputted by register 61. Thus, at this stage, increment circuit 65 outputs a "00010" signal to comparator 66. This value is less than the "01001" signal received at the negative input port, so comparator 66 continues to output a logic low level on line 68. Consequently, multiplexer 60 continues to select the output signal of increment circuit 65 (i.e., "00010" at this point).

On the falling edge of the CORE_CLK signal, register 63 loads the logic low level signal on line 69. Thus, register 63 outputs a logic low level to AND gate 64, which causes AND gate 64 to output the MASK signal with a logic low level.

On the next rising edge of the CORE_CLK signal (i.e., cycle 2), register 61 loads the "00010" signal from multiplexer 60. Register 61 now outputs "00010" to comparator 62 and to increment circuit 65. Because "00010" is less than "00100", comparator 62 continues to output a logic low level on line 69. Also, the "00010" signal from register 61 causes increment circuit 65 to output a "00011" to comparator 66 and multiplexer 60. Because "00011" is not greater than "01001", comparator 66 continues to output a logic low level signal on line 68. Thus, multiplexer 60 continues to select the output signal from increment circuit 65, which has transitioned to "00011".

On the falling edge of the CORE_CLK signal, register 63 loads the logic low level on line 69 from comparator 62. Thus, register 63 continues to output a logic low level, which causes AND gate 64 to continue to output the MASK signal with a logic low level.

Similarly, on the next rising edge of the CORE_CLK signal (i.e., cycle 3), register 61 loads the "00011" signal from multiplexer 60. Register 61 now outputs "00011" to comparator 62 and to increment circuit 65. Because "00011" is less than "00100", comparator 62 continues to output a logic low level on line 69. Also, the "00011" signal from register 61 causes increment circuit 65 to output a "00100" to comparator 66 and multiplexer 60. Because "00100" is less than "01001", comparator 66 continues to output a logic low level signal on line 68. Thus, multiplexer 60 continues to select the output signal from increment circuit 65, which has transitioned to "00100".

On the falling edge of the CORE_CLK signal, register 63 loads the logic low level on line 69 from comparator 62. Thus, register 63 continues to output a logic low level, which causes AND gate 64 to continue to output the MASK signal with a logic low level.

However, on the next rising edge of the CORE_CLK signal (i.e., cycle 4), register 61 loads the "00100" signal from multiplexer 60. Register 61 now outputs "00100" to comparator 62 and to increment circuit 65. The "00100" signal from register 61 causes increment circuit 65 to output a "00101" to comparator 66 and multiplexer 60. Because "00101" is less than "01001", comparator 66 continues to output a logic low level signal on line 68. Thus, multiplexer 60 continues to select the output signal from increment circuit 65, which has transitioned to "00101". However, because the "00100" from register 61 is not less than "00100" received at its negative input port, comparator 62 now outputs a logic high level to register 63 via line 69.

On the falling edge of the CORE_CLK signal, register 63 loads the logic high level on line 69 from comparator 62. Thus, register 63 now outputs a logic high level, which causes AND gate 64 to output the MASK signal with a logic high level, thereby causing gating circuit 33 to mask the CORE_CLK signal as previously described. As a result, the first four clock cycles of the CORE_CLK signal were not masked, while the fifth clock cycle will be masked.

On the next rising edge of the CORE_CLK signal (i.e., cycle 5), register 61 loads the "00101" signal from multiplexer 60. Register 61 now outputs "00101" to comparator 62 and to increment circuit 65. Because "00101" is not less than "00100", comparator 62 continues to output a logic high level on line 69. Also, the "00101" signal from register 61 causes increment circuit 65 to output a "00110" to comparator 66 and multiplexer 60. Because "00110" is less than "01001", comparator 66 continues to output a logic low level signal on line 68. Thus, multiplexer 60 continues to select the output signal from increment circuit 65, which has transitioned to "00110".

On the falling edge of the CORE_CLK signal, register 63 loads the logic high level on line 69 from comparator 62. Thus, register 63 continues to output a logic high level, which causes AND gate 64 to continue to output the MASK signal with a logic high level.

Mask generator 41 operates in a similar manner (i.e., to cycle 5) for clock cycles 6 and 7, with the value stored by register 61 being incremented with each clock cycle of the CORE_CLK signal. However, on cycle 8, register 61 loads a "01000" signal from multiplexer 60. Register 61 now outputs "01000" to comparator 62 and to increment circuit 65. Because "01000" is greater than "00100", comparator 62 continues to output a logic high level on line 69. Also, the "01000" signal from register 61 causes increment circuit 65 to output a "01001" to comparator 66 and multiplexer 60. Because "01001" signal from increment circuit 65 is not less than the "01001" signal received at its "negative" input port, comparator 66 outputs a logic high level signal on line 68. Thus, multiplexer 60 selects the "00000" signal.

On the falling edge of the CORE_CLK signal, register 63 loads the logic high level on line 69 from comparator 62. Thus, register 63 continues to output a logic high level, which causes AND gate 64 to continue to output the MASK signal with a logic high level. Thus, cycles 5-9 of the CORE_CLK signal will be masked.

On the rising edge of cycle 9, register 61 loads the "00000" signal from multiplexer 60. Register 61 now outputs "00000" to comparator 62 and to increment circuit 65. Because "00000" is less than "00100", comparator 62 now outputs a logic low level on line 69. Also, the "00000" signal from register 61 causes increment circuit 65 to output a "00001" to comparator 66 and multiplexer 60. Because "00001" is less than "01001", comparator 66 now outputs a logic low level signal on line 68. Thus, multiplexer 60 now selects the output signal from increment circuit 65, which has transitioned to "00001".

On the falling edge of the CORE_CLK signal, register 63 loads the logic low level on line 69 from comparator 62. Thus, register 63 now outputs a logic low level, which causes AND gate 64 to output the MASK signal with a logic low level. As a result, during cycle 10, the CORE_CLK signal will not be masked. The process is then restarted, with cycle 10 being performed as described above for cycle 1 for as long as the SLOW_SELECT signal is asserted.

When a reset operation is performed while the SLOW_SELECT signal is asserted, multiplexer 60 will select the "00001" signal so that the mask signal will be properly aligned from a rising edge of the clock signal for bus 15 (FIG. 1).

In alternative embodiments, different circuitry may be used to implement mask generator 41.

Figure 7:
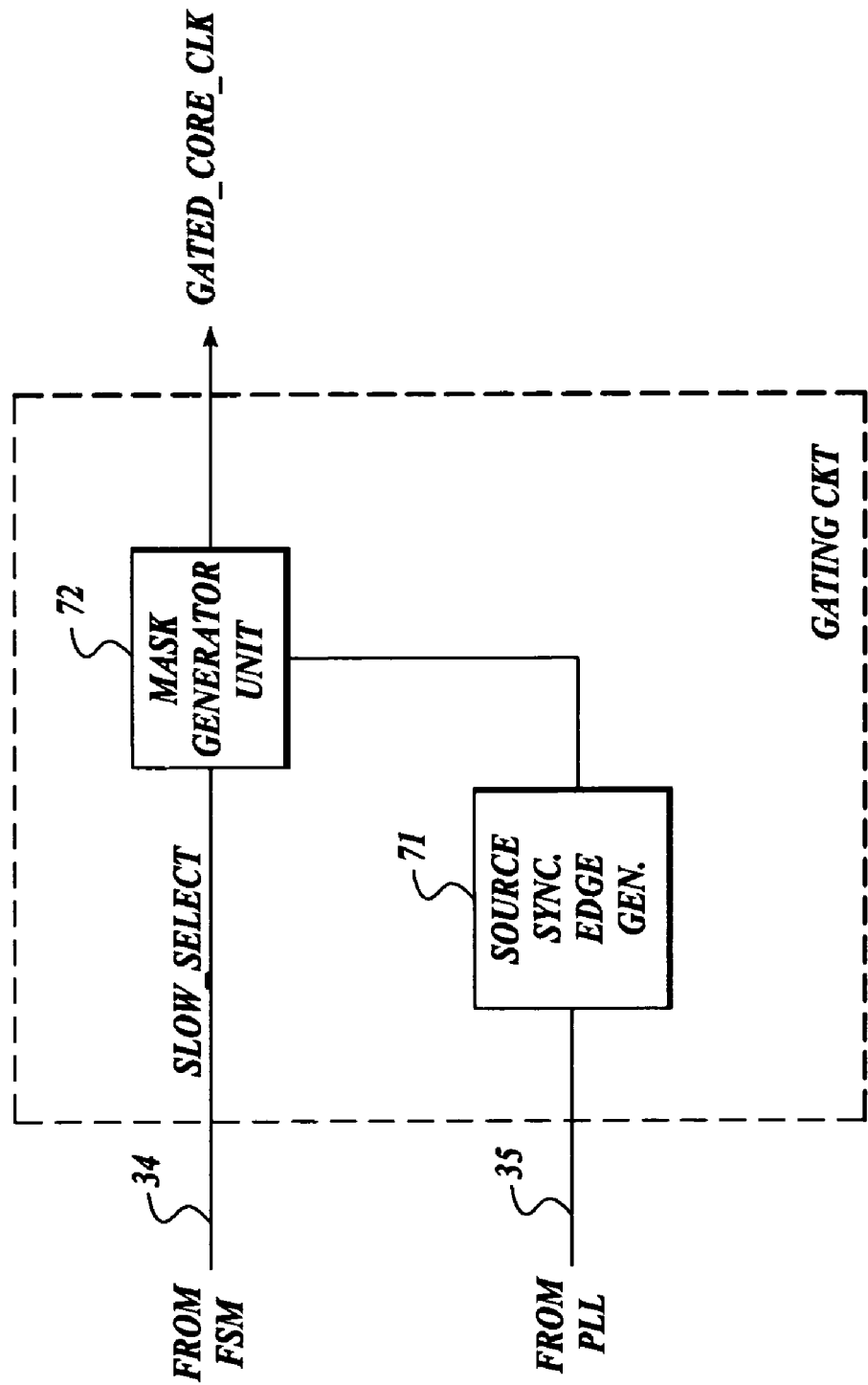
FIG. 7 is a diagram illustrating an implementation of the gating circuit of FIG. 3 for use with a source synchronous bus, according to an embodiment of the present invention.

FIG. 7 illustrates an implementation of a gating circuit 33A (FIG. 3) for use with a source synchronous bus, according to another embodiment of the present invention. As is known in the art, a source synchronous bus in effect divides a bus clock cycle into multiple segments (e.g., four) by using multiple data strobe signals. Each data strobe signal is sampled, requiring four accurately timed sampling edges. The unit generating the sampling edges, therefore, cannot receive the GATED_CORE_CLK signal and still allow the processor to monitor bus 15 (FIG. 1). Further, in order to preserve seamless transitions between the "slow" and "fast" core clock states 31A and 31B (FIG. 3), the GATED_CORE_CLK signal should be aligned and configured so that the source synchronous sampling edges will be properly timed. For example, in one embodiment, the GATED_CORE_CLK signal is generated so that there is an edge after or together with every external bus clock edge. Otherwise, if there are two consecutive bus clock transitions while none in the GATED_CORE_CLK signal, then an incoming datum will be lost (not sampled). The waveform of the GATED_CORE_CLK signal may be tailored in various fashions to work properly with the target bus clock. For instance, gating circuit 33A can be configured to generate a more symmetric wave (e.g., in duty cycle), which would be easier to match with a symmetric 400 MHz on the external bus.

In this embodiment, gating circuit 33A includes a source synchronous edge generator (SSEG) unit 71 and a mask generator unit 71. Mask generator unit 71 is similar in function to mask generator 41 and AND gates 43 and 45 (FIG. 4) in that mask generator unit 71 generates the GATED_CORE_CLK signal. In one embodiment, SSEG unit 71 receives the CORE_CLK signal and in response generates a SOURCE_SYNC_CORE_CLK signal that meets the timing requirements of the source synchronous bus. Mask generator unit 71 then uses the SOURCE_SYNC_CORE_CLK signal to have an edge after or together with every external bus clock edge. This embodiment advantageously allows processor 11 (FIG. 1) to monitor the source synchronous bus during the "slow" core clock state 31B (FIG. 3).

Embodiments of method and apparatus for a clock frequency control unit are described herein. In the above description, numerous specific details are set forth (implementations of gating circuit 33, mask generator 41, etc.) to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A method comprising:

when a processor is operating in a first state, monitoring the processor's operation for a first set of selected conditions, the processor having a plurality of functional units, the plurality of functional units receiving a clock signal with a first frequency when the processor is operating in the first state, the first set of selected conditions being indicative of a low workload period in the processor;

selecting a grace period from a plurality of programmable grace periods based on detecting which one of the first set of selected conditions is satisfied, wherein each of the plurality of programmable grace periods stores a different grace period to allow completion or processing of a different event;

waiting for the selected grace period to expire after detecting that the one of the first set of selected conditions is satisfied; and causing the processor to operate in a second state after expiration of the selected grace period, wherein in the second state the clock signal has a second frequency that is less than the first frequency, wherein one of the plurality of programmable grace periods is used to allow one or more pending store operations to be processed prior to the processor operating in the second state.

2. The method of claim 1, further comprising:

when the processor is operating in the second state, monitoring the processor operation for a second set of selected conditions, the second set of selected conditions being indicative of the termination of the low workload period; and causing the processor to operate in the first state when the second set of selected conditions is satisfied.

3. The method of claim 2, wherein the first set of selected conditions includes:

a cache miss signal being asserted by a level two cache.

4. The method of claim 2, wherein the second set of selected conditions comprises a signal indicating that the level two cache is ready for a memory transaction.

5. The method of claim 2, wherein one of the plurality of programmable grace periods is selected to allow the processor to complete an arithmetic operation.

6. The method of claim 5, wherein the arithmetic operation is a multiply or a divide operation.

7. The method of claim 2, wherein the second set of selected conditions comprises a receipt of a snoop request.

8. The method of claim 2, wherein the second set of selected conditions comprises assertion of an interrupt signal.

9. The method of claim 2, wherein the second set of selected conditions comprises assertion of a reset signal.

10. The method of claim 2, wherein the second set of selected conditions comprises assertion of a stop clock signal.

11. The method of claim 1, wherein one of the plurality of programmable grace periods is selected to allow operations waiting in one or more reservation stations to be executed.

* * * * *